US009225766B2

(12) United States Patent
Philip et al.

(10) Patent No.: US 9,225,766 B2
(45) Date of Patent: Dec. 29, 2015

(54) SYSTEMS AND METHODS FOR PROVIDING SMART APPLIANCES

(75) Inventors: Philip K. Philip, Schaumburg, IL (US); Tom DeSalvo, St. Charles, IL (US); Ellen Tave Glassman, Closter, NJ (US); Betsy Owens, Winnetka, IL (US); Lori Wood, Cary, IL (US); John Timmons, Aurora, IL (US); Samuel Monnie, Glenview, IL (US); Michael Kozlowski, Barrington Hills, IL (US); Terrilynn Million Short, Oak Park, IL (US); Mikeil Dcosta, Bolingbrook, IL (US); Jason Silverstein, Hoffman Estates, IL (US); Heather Jones, Schaumburg, IL (US); Michael Saubert, Hoffman Estates, IL (US); John Lash, Hoffman Estates, IL (US); Christopher Salatino, Hoffman Estates, IL (US)

(73) Assignee: Sears Brands, L.L.C., Hoffman Estates, IL (US)

( * ) Notice: Subject to any disclaimer, the term of this patent is extended or adjusted under 35 U.S.C. 154(b) by 0 days.

(21) Appl. No.: 13/283,943

(22) Filed: Oct. 28, 2011
(Under 37 CFR 1.47)

(65) Prior Publication Data
US 2012/0226764 A1 Sep. 6, 2012

Related U.S. Application Data

(60) Provisional application No. 61/407,989, filed on Oct. 29, 2010.

(51) Int. Cl.
*H04L 29/08* (2006.01)

(52) U.S. Cl.
CPC ............ *H04L 67/025* (2013.01); *H04L 67/125* (2013.01)

(58) Field of Classification Search
CPC .......................... H04L 12/2827; H04L 67/025
USPC .......................................................... 709/208
See application file for complete search history.

(56) References Cited

U.S. PATENT DOCUMENTS

| 4,899,129 | A | * | 2/1990 | MacFadyen | ....... G08B 13/1418 340/12.32 |
| 5,632,614 | A | * | 5/1997 | Consadori et al. | ............... 431/79 |
| 5,801,940 | A | * | 9/1998 | Russ et al. | ........................ 700/9 |

(Continued)

OTHER PUBLICATIONS

Park et al., "Concurrent Simulation Platform for Energy-Aware Smart Metering Systems", 2010.*

(Continued)

*Primary Examiner* — O. C. Vostal
(74) *Attorney, Agent, or Firm* — McAndrews, Held & Malloy, Ltd.

(57) ABSTRACT

A method and system for networking a plurality of appliances. The method and system include providing an appliance on a network, controlling operation of the appliance with a microcontroller, storing on a memory coupled with the microcontroller, computer executable instructions for operating the appliance, sensing the operation of the appliance, displaying information regarding the operation of the appliance, and communicating the operational data on a network. Network connectivity includes communication directly with a network, and with another appliance. A host system is connected to the network and adapted to receive the usage data and to transmit data to the appliance to influence operation of the appliance.

20 Claims, 3 Drawing Sheets

(56) References Cited

U.S. PATENT DOCUMENTS

| | | | |
|---|---|---|---|
| 6,496,575 B1 | 12/2002 | Vasell et al. | |
| 6,549,818 B1 | 4/2003 | Ali | |
| 6,766,143 B1* | 7/2004 | Beckwith | 455/66.1 |
| 7,024,385 B1* | 4/2006 | Adcock et al. | 705/37 |
| 7,136,940 B2 | 11/2006 | Roh et al. | |
| 7,340,414 B2 | 3/2008 | Roh et al. | |
| 7,356,384 B2* | 4/2008 | Gull | H02J 3/005 700/276 |
| 7,884,727 B2* | 2/2011 | Tran | 340/573.1 |
| 8,118,997 B2* | 2/2012 | Ebrom | H04L 69/26 210/141 |
| 8,170,695 B2* | 5/2012 | Spicer et al. | 700/22 |
| 8,212,889 B2* | 7/2012 | Chanas et al. | 348/224.1 |
| 8,290,635 B2* | 10/2012 | Cohen | H02J 3/14 340/657 |
| 8,403,501 B2* | 3/2013 | Jung et al. | 353/94 |
| 8,849,471 B2* | 9/2014 | Daniel | F03D 9/00 307/28 |
| 2001/0010032 A1* | 7/2001 | Ehlers et al. | 702/62 |
| 2002/0161536 A1* | 10/2002 | Suh | G01D 4/004 702/62 |
| 2003/0109938 A1 | 6/2003 | Daum et al. | |
| 2004/0002779 A1* | 1/2004 | Shimba et al. | 700/90 |
| 2004/0150519 A1* | 8/2004 | Husain et al. | 340/506 |
| 2004/0158620 A1 | 8/2004 | Ha et al. | |
| 2005/0080879 A1 | 4/2005 | Kim et al. | |
| 2005/0129035 A1* | 6/2005 | Saito | 370/401 |
| 2005/0171645 A1* | 8/2005 | Oswald | G05B 15/02 700/276 |
| 2005/0188047 A1* | 8/2005 | Joy et al. | 709/207 |
| 2005/0269394 A1* | 12/2005 | Ozer | 235/375 |
| 2006/0004920 A1* | 1/2006 | Hallenbeck | 709/224 |
| 2006/0154642 A1* | 7/2006 | Scannell, Jr. | 455/404.1 |
| 2006/0208099 A1* | 9/2006 | Chapman et al. | 236/51 |
| 2006/0271695 A1* | 11/2006 | Lavian | 709/229 |
| 2007/0058634 A1* | 3/2007 | Gupta et al. | 370/392 |
| 2007/0129812 A1* | 6/2007 | Ferchau | 700/1 |
| 2007/0174410 A1* | 7/2007 | Croft et al. | 709/208 |
| 2008/0167756 A1* | 7/2008 | Golden et al. | 700/297 |
| 2008/0177678 A1* | 7/2008 | Di Martini | G01D 4/002 705/412 |
| 2008/0272934 A1* | 11/2008 | Wang | H02J 3/14 340/870.11 |
| 2008/0313007 A1* | 12/2008 | Callahan et al. | 705/9 |
| 2009/0170532 A1* | 7/2009 | Lee et al. | 455/456.3 |
| 2010/0039263 A1* | 2/2010 | Chen et al. | 340/572.1 |
| 2010/0060479 A1* | 3/2010 | Salter | 340/870.4 |
| 2010/0070091 A1* | 3/2010 | Watson | G06Q 50/06 700/278 |
| 2010/0076835 A1* | 3/2010 | Silverman | 705/14.33 |
| 2010/0083356 A1* | 4/2010 | Steckley et al. | 726/5 |
| 2010/0088261 A1* | 4/2010 | Montalvo | 706/15 |
| 2010/0090806 A1* | 4/2010 | Schork | G06Q 50/06 340/10.4 |
| 2010/0094470 A1* | 4/2010 | Besore | G06Q 50/06 700/282 |
| 2010/0102082 A1* | 4/2010 | Ebrom et al. | 222/52 |
| 2010/0167659 A1* | 7/2010 | Wagner | 455/67.11 |
| 2010/0169035 A1* | 7/2010 | Liang et al. | 702/65 |
| 2010/0187914 A1* | 7/2010 | Rada | G05F 1/70 307/105 |
| 2010/0217550 A1* | 8/2010 | Crabtree | H02J 13/0079 702/62 |
| 2010/0245583 A1* | 9/2010 | Harel | 348/159 |
| 2010/0250590 A1* | 9/2010 | Galvin | G06F 1/3203 707/770 |
| 2010/0262313 A1* | 10/2010 | Chambers et al. | 700/295 |
| 2010/0293375 A1* | 11/2010 | Dobos et al. | 713/168 |
| 2010/0301672 A1* | 12/2010 | Di Cristofaro | 307/39 |
| 2010/0305889 A1* | 12/2010 | Tomlinson, Jr. | G01D 1/00 702/62 |
| 2011/0018729 A1 | 1/2011 | Kim et al. | |
| 2011/0046805 A1* | 2/2011 | Bedros et al. | 700/291 |
| 2011/0060553 A1* | 3/2011 | Han et al. | 702/185 |
| 2011/0082599 A1* | 4/2011 | Shinde et al. | 700/295 |
| 2011/0082900 A1* | 4/2011 | Nagpal et al. | 709/203 |
| 2011/0153246 A1* | 6/2011 | Donaldson | G01R 21/1331 702/65 |
| 2011/0178937 A1* | 7/2011 | Bowman | 705/314 |
| 2011/0282504 A1* | 11/2011 | Besore | H02J 3/14 700/291 |
| 2011/0302125 A1* | 12/2011 | Shetty | G06Q 50/06 706/52 |
| 2012/0050037 A1* | 3/2012 | Brian et al. | 340/540 |
| 2012/0054712 A1* | 3/2012 | Melvin et al. | 717/101 |
| 2012/0054852 A1* | 3/2012 | Gibbs et al. | 726/15 |
| 2012/0271469 A9* | 10/2012 | Masters et al. | 700/292 |

OTHER PUBLICATIONS

Lu et al., "SmartGridLab: A Laboratory-Based Smart Grid Testbed", 2010.*

Jiang et al., "Design and Implementation of a High-Fidelity AC Metering Network", 2009.*

Helal, "Programming Pervasic Spaces", 2005.*

Merriam-Webster, "microcontroller", 2015.*

Canadian Intellectual Property Office, Requisition by Examiner, in Application No. 2,756,475, dated Dec. 12, 2013. (3 pages).

Canadian Intellectual Property Office, Requisition by Examiner, in Application No. 2,756,475, dated Feb. 12, 2015. (3 pages).

* cited by examiner

SYSTEMS AND METHODS FOR PROVIDING SMART APPLIANCES

CROSS REFERENCE TO RELATED APPLICATION

This application is a non-provisional application claiming priority from U.S. Provisional Application Ser. No. 61/407,989, filed Oct. 29, 2010, entitled "Systems and Methods for Providing Smart Appliances" and incorporated herein by reference in its entirety.

FIELD OF THE INVENTION

The subject invention generally relates to systems and methods for a networking appliances, and more particularly, to systems and methods for providing smart appliances.

BACKGROUND OF RELATED ART

Appliances adapted to provide remote diagnostic data are generally known in the art. By way of example, U.S. Published Application No. 2011/0060553 describes a home appliance that functions to output product information as a sound signal. A service center remotely performs fault diagnosis of the home appliance by receiving the sound signal, detecting the product information from the sound signal, and checking the state of the home appliance using diagnostic data that is also included in the product information.

In addition, U.S. Pat. No. 7,340,414 describes a refrigerator capable of transmitting and receiving information over a network and having an automatic food ordering function. Residual amounts of food articles stored in containers of the refrigerator are measured through sensors installed in the containers and then displayed on a screen of a display unit, thereby enabling a user to easily recognize the residual amounts of the food articles stored in the refrigerator without opening the door of the refrigerator. The measured residual amounts of the food articles are compared with minimum proper amounts of the food articles preset by the user. In the case where the measured residual amount of a specific one of the food articles is smaller than the minimum proper amount of the specific food article, the specific food article is automatically ordered and delivered.

Still further, U.S. Pat. No. 7,136,940 describes an Internet refrigerator and a Web pad for operating the same. The Web pad is detachably mounted on the Internet refrigerator, and transmits and receives data to/from the Internet refrigerator on the basis of a remote display protocol. The Web pad is a client Web pad detachably mounted on an outer surface of the Internet refrigerator. The client Web pad is adapted to receive a display signal transmitted from the Internet refrigerator and output the received display signal externally. A server control unit is provided to transmit the display signals to the client Web pad on the basis of the remote display protocol such that data processed in the Internet refrigerator is displayed through the client Web pad. Application programs and multimedia data are driven on the basis of the server control unit, resulting in a reduction in work-load on the client Web pad.

Yet further, U.S. Pat. No. 6,549,818 describes a cooking appliance, such as a stove or oven, which has the ability to download cooking recipes from the Internet. The recipes include a food list and pre-cooking directions which are displayed to a user. The recipes also include a cooking temperature schedule which is used by the temperature controller of the food-heating unit to automatically assist in heating the appliance in accordance with the recipes.

While such exemplary appliances work for the described purposes, a need exists for improved networked appliances which provide a multitude of advantages not yet seen in the art.

BRIEF DESCRIPTION OF THE DRAWINGS

For a better understanding of the present disclosure, reference may be had to various examples shown in the attached drawings.

DETAILED DESCRIPTION

The following description of example methods and apparatus is not intended to limit the scope of the description to the precise form or forms detailed herein. Instead the following description is intended to be illustrative so that others may follow its teachings.

Example methods and systems for providing interoperability with household appliances is disclosed herein. The example systems allow for interoperability with different manufacturers of smart household appliances for the development of energy efficiency, smart grid capability, and/or internet connected services. In general, the disclosed features will connect consumers with their home appliances in meaningful and productive ways. Through interactive digital connectivity, a manufacturer may be able to provide a consumer with control over their appliances as well as enhanced efficiencies, effectiveness, enjoyment, and overall productivity of the household activity to which these appliances relate.

In one example, the system provides the use of commodity hardware, off the shelf software, OS independent applications, form factor independent devices (PC, tablets, smart phones etc), media independent (voice, text, video) and cloud based infrastructure to run all functionalities of the appliance connectivity. This is in contrast to the specialized hardware, proprietary software and/or dedicated, non-interconnected processors that typically run current appliances. In the context of a consumer environment, such as, for example, a residence, the disclosed methods and systems are particularly useful for providing enhanced services as will be described in detail herein.

Figure 1:
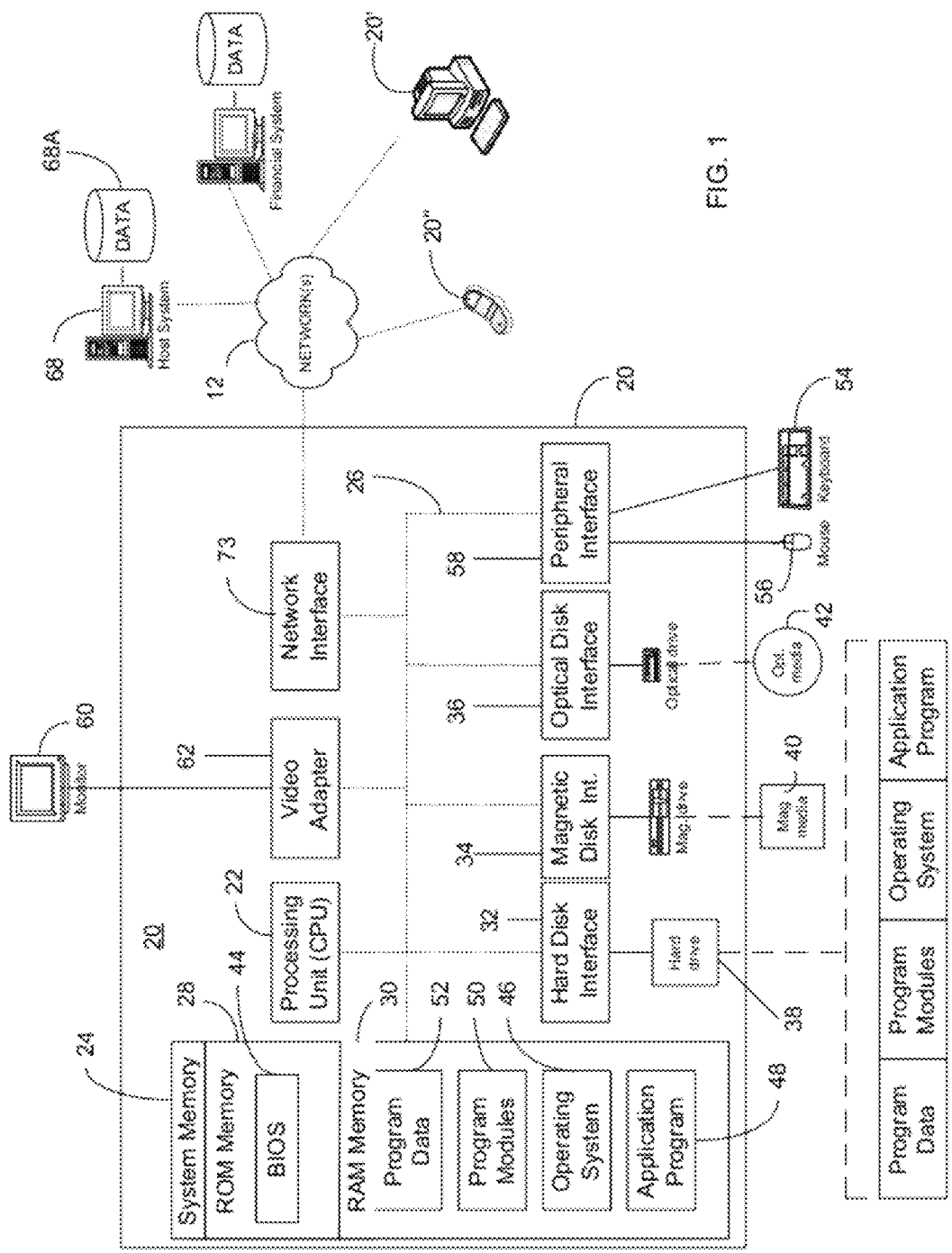
FIG. 1 is a system diagram of an example appliance with network capabilities in accordance with the teachings of the present disclosure.

With reference to the figures, the following discloses various example systems and methods for providing distributed mobile video call centers on a computer network. To this end, a processing device 20", illustrated in the exemplary form of a mobile communication device, a processing device 20', illustrated in the exemplary form of a computer system, and a processing device 20 illustrated in schematic form, such as for example, an appliance, are provided with executable instructions to, for example, provide a means for a customer, e.g., a user, consumer, etc., to interact with the device 20 and/or to access a host system server 68. Generally, the computer executable instructions reside in program modules which may include routines, programs, objects, components, data structures, etc. that perform particular tasks or implement particular abstract data types. Accordingly, those of ordinary skill in the art will appreciate that the processing devices 20, 20', 20" illustrated in FIG. 1 may be embodied in any device having the ability to execute instructions such as, by way of example, an appliance, a personal computer, mainframe computer, personal-digital assistant ("PDA"), cellular telephone, tablet, ereader, or the like. Furthermore, while described and illustrated in the context of a single processing device 20, 20', 20" those of ordinary skill in the art will also appreciate that the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer readable instructions, data structures, program modules and other data for the processing device 20. Those of ordinary skill in the art will further appreciate that other types of non-transitory computer readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system server 68 having associated data repository 68A. In this regard, while the host system server 68 has been illustrated in the exemplary form of a computer, it will be appreciated that the host system server 68 may, like processing device 20, be any type of device having processing capabilities. Again, it will be appreciated that the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, etc.

For performing tasks as needed, the host system server 68 may include many or all of the elements described above relative to the processing device 20. In addition, the host system server 68 would generally include executable instructions for, among other things, receiving a request for a service call center connection, routing the request via a distributed mobile video call center, and providing a service call infrastructure for providing the requestor with a distributed customer service experience.

Communications between the processing device 20 and the host system server 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, it will be appreciated that program modules depicted relative to the processing device 20, or portions thereof, may be stored in the non-transitory memory storage device(s) of the host system server 68.

Figure 2:
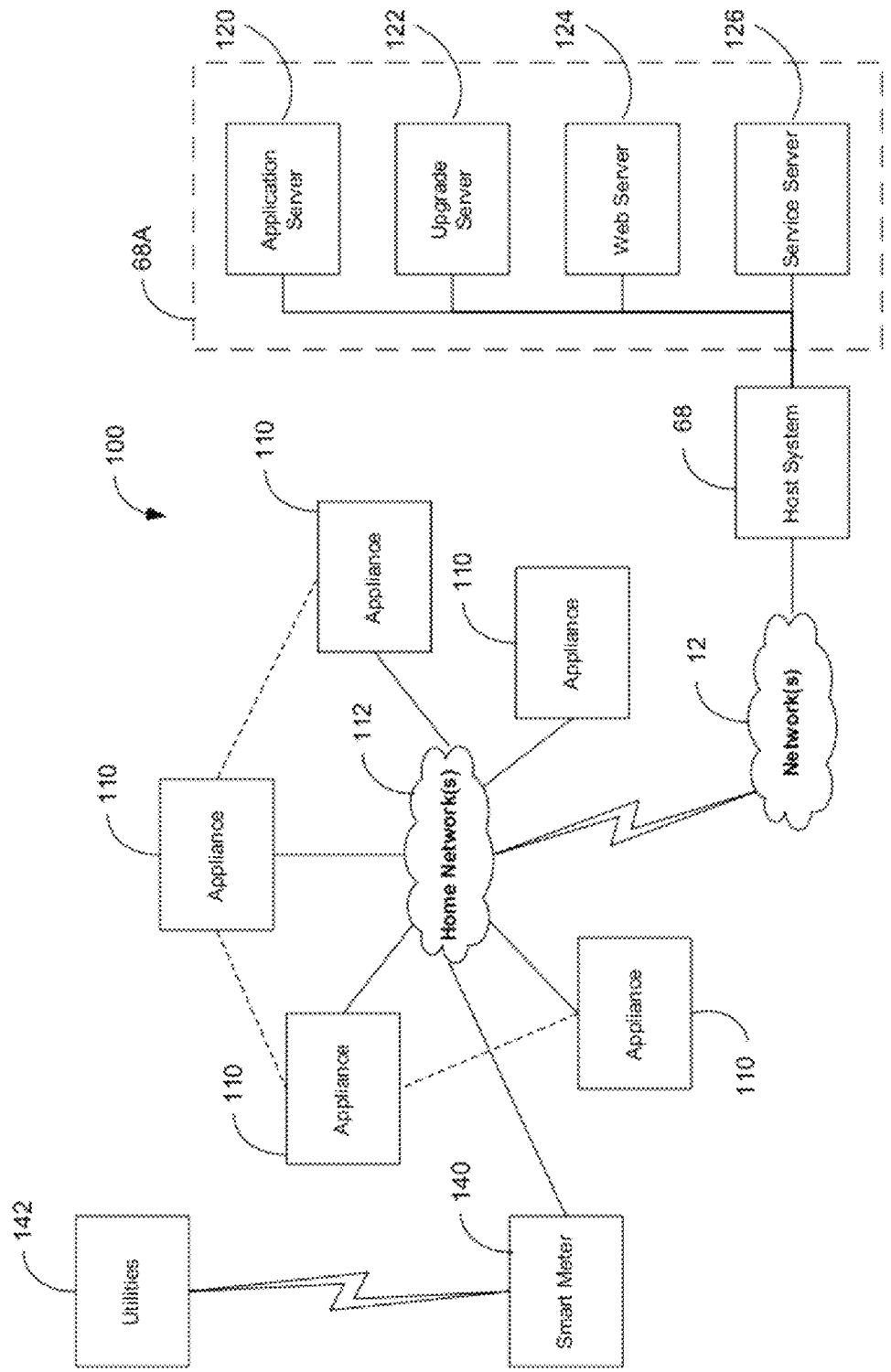
FIG. 2 is an example network diagram showing an example appliance network system including an appliance of FIG. 1.

FIG. 2 illustrates an example system 100 for providing a network of smart appliances. The system comprises a plurality of appliances 110 connected to a local network 112 and in some instances, ultimately connected to the network 12. In this example, each appliance 110 may be any suitable device, including any home appliance typical of a residence and/or corporate setting. These appliances may include, for example, a dishwasher, refrigerator, freezer, microwave, trash disposer, trash compactor, small kitchen appliance, specialty appliance, range, cooktop, oven, washer, dryer, and/or the like. It will be understood that there are many other appliances and/or pieces of equipment that may be used with the system 100 without departing from the spirit of the present disclosure. Furthermore, the present disclosure may take advantage of current trends to provide appliances with microprocessors and/or sensors to monitor and/or program functionality.

In the example system 100, the example appliances 110 include a communication protocol to allow the appliances to connect to the local network 112 through a wireless and/or a wired connection. Additionally, the example appliances 110 may be capable of proprietary and/or standard communication between appliances as illustrated. The example appliances are configured to measure the internal functions and/or status of the appliance, as provide network and/or communication capability to a user. The appliance 110 may also be configured to store historical data regarding the usage and/or operation of the appliance for diagnostic, statistical, and/or other usage.

Figure 3:
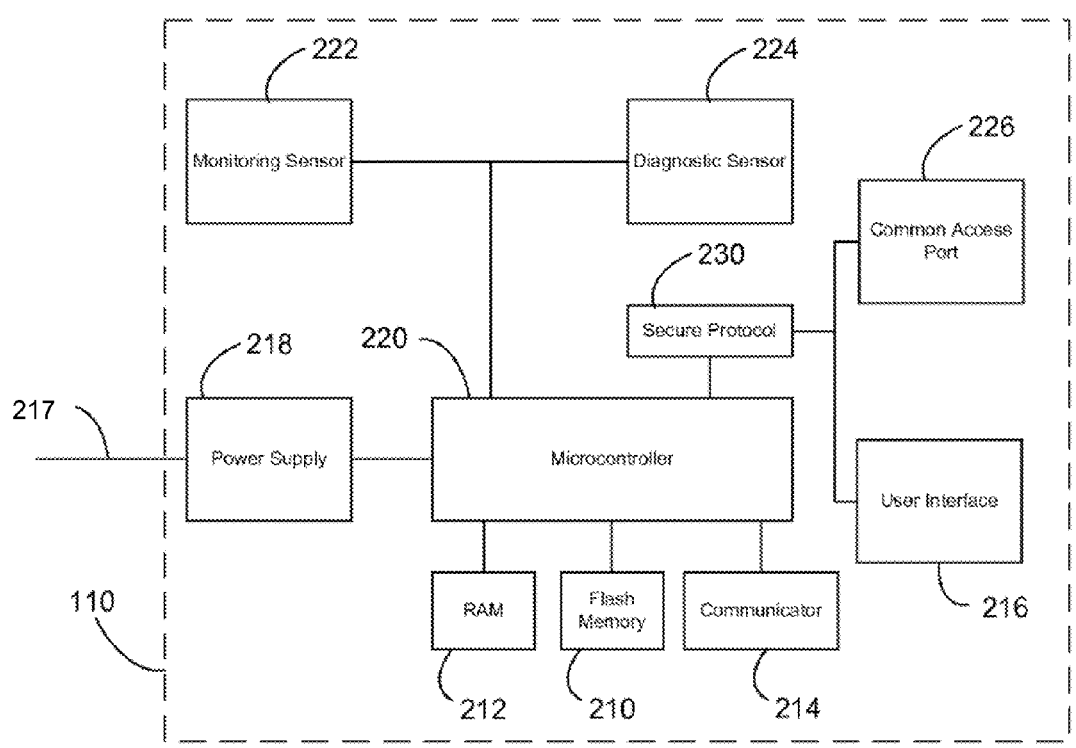
FIG. 3 is a component diagram of an example appliance suitable for use in the example system of FIG. 2.

For example, as illustrated in FIG. 3, an example appliance 110 includes a flash memory 210 and/or a random access memory (RAM) 212 to store the collected operational and/or other data relevant to the appliance 110. The appliance 110 may use other types of memory in addition to, or in lieu of, flash memory 210 and RAM 212 to store data relevant to the operation, wellbeing, history, and/or the like. The data is, in turn, transmitted to the host system 68 (see FIG. 1) such as, for example, a personal computer (PC), terminal, router, smartphone, tablet, or other suitable device) via a communicator 214 such as a wireless connection using the local area network with WiFi, ZigBee®, Bluetooth, USB, Ethernet, infrared, or the like. While the connection between the appliance 110 and the host system 68 is illustrated as being a network connection, a person of ordinary skill in the art will recognize that the data connection may be any suitable connection including any wireless and/or wired connection as desired. For example, in at least one embodiment, the system 100 allows for communication between the appliance 110 and the host system 68 through a modem connection, such as over the public switched telephone network (PSTN), Voice over Internet Protocol (VoIP), etc., including a dedicated modem or through transmission of data during a service call. Software, firmware, and/or hardware executing and/or contained within appliance 110 processes the data generated by the appliance 110. The appliance 110 is adapted to at least one of displays the data on an integrated and/or external display having a user interface 216, and/or transmit the data to the host system 68, such as a company-operated customer service server through an Internet, cloud, cellular, wireless, wired, LAN, tethered, and/or any other suitable connection.

In one example, a user may call a traditional customer service line to connect (via voice) to a customer service agent having access to the host system 68. The customer service agent may prompt the user to activate the communicator 214, such as for example, by pressing an external activation button. The communicator 214, once activated, may transmit data by modulating an analog carrier signal to encode digital information to transmit the relevant data over the phone line to host system 68 for use by the customer service agent. Once the data is transmitted to the host system 68, the voice conversation between the customer service agent and the user may continue. To provide service to the appliance 110, the customer service agent may instruct the user to perform certain steps, may give advice and/or recommendations regarding usage, may transmit data back to the appliance 110 through a modem connection via the communicator 214, and/or may schedule a service call if necessary.

Referring again to FIG. 2, in the illustrated example, the transmitted appliance data is segregated and/or targeted for different services and/or servers. In this example, the data segmentation includes an application server 120, an upgrade server 122, a web server 124, and a service server 126. While the data is segregated in the illustrated example, the data need not be divided or alternatively may be divided even further as desired.

The example application server 120 may provide the appliance 110 with custom, semi-custom, and/or generic application specific to the appliance 110, and/or providing generic capabilities to the appliance 110. For example, the application server may provide the appliance with any type of application including a graphical user interface, weather, web-browser, news, sports, gaming, productivity, etc. The application server may be coupled to an external application store to provide additional applications, such as for example an application market. The example upgrade server 122 may provide system software, firmware, middleware, software, and/or other updates for the appliance 110. The upgrades may be pushed and/or pulled from the server 122 to the appliance 110 as needed. The example web server 124 may provide the appliance with a portal to the Internet, cloud, web, network, etc. Access to the network services may also be provided through the network 12. Finally, the example service server 126 may provide customer service including diagnostic code interpretation, error code interpretation, operational suggestions, maintenance reminders, etc.

The appliance 110 may also transmit energy use data to a smart meter 140, via a wireless connection using ZigBee® or the like. In this example, the smart meter 140 is a typical electrical meter that records consumption of electric energy in predefined intervals, such as intervals of an hour or less and communicates consumption information back to a utility company 142 for monitoring and/or billing purposes. Typically, the smart meter 140 enables two-way communication between the meter and a central system. Accordingly, the utility company 142 providing the power to the appliances 110 and/or other equipment via a power line can access the energy use data stored on the smart meter 180 for further review. Additionally, in at least one example, the appliance 110 can access the smart meter 180 to retrive data regarding the power grid. For example, the appliance 110 may access the smart meter 180 to inquire as to the best time to operate a schedulable batch process, such as a washing and/or drying cycle, by determining when the electrical costs are minimized. In this instance, the appliances 110 may coordinate with the smart grid to produce savings to the operator.

Returning to FIG. 3, the example appliance 110 comprises a line interface 217 and a power supply 218 which is electrically coupled to the utilities 142 to rectify and provide line powered voltage to a microcontroller 220, the memories 210, 212, the communicator 214, sensors, such as a monitoring sensor 222, a diagnostic sensor 224, and the user interface 216. A common access port (CAP) 226 and the user interface 216 may be coupled to the microcontroller through a secure protocol 230, such as an encryption routine, a firewall, a password protected protocol, and/or the like. The common access port 226 provides for a common access point for technicians, service individuals, etc., independent of the appliance's connection with the networks 112 and/or 12.

It will be appreciated that the monitoring sensor 222 and the diagnostic sensor 224 provide the microcontroller with data regarding the operation and/or health of the appliance 110. It will be further appreciated that any number of sensors 222, 224 may be used and/or removed as necessary.

The example appliances 110 may be connected such that the appliances 110 are able to communicate with one another. Thus, each appliance 110 may be able to provide information relevant to the operation of another appliance 110 within the network as desired. The appliances may be able to coordinate operations (e.g., cycle times, optimization of electrical rates, etc.), may be able to provide information regarding operation (e.g., recipe ingredients and cook times), may provide diagnostic codes, updates, etc. Additionally, each of the appliances may be better able to communicate with the smart grid to provide added energy usage benefits.

As noted above, the example appliances 110 may be able to connect to internet through the communicator 214 and the user interface 216. The appliance may include open and/or closed access to content on the Internet as desired. For example, the appliance may be able to be updated through the Internet or other network, by a connection to the upgrade server 122, and/or may be updated through access through the common access port 226. Each example appliance 110 includes the capability to operate as a traditional appliance if desired without access to the Internet or other network if desired.

The example system 100 supports the remote monitoring, control, and diagnosis of each appliance 110 integrated into the system by the service server 126. In this instance, the appliance 110 and the sensors 222, 224 provide monitoring capabilities for all major systems within the appliance 110 and for all monitorable failure modes. The example appliances 110 can communicate through the system 100 reliable information regarding the operation of the appliance including self diagnostic information, usage, predicted life remaining, etc. The service server 126 may remotely program the microcontroller 220 to alter operational parameters as desired to circumvent and/or avoid a monitored and/or predicted failure.

The example system 100 further allows for a "plug-and-play" setup features that allows for an appliance to be integrated into the system 100 with minimal setup and/or configuration required. In particular, in one instance, a new appliance 110 may be added to the system by locating the appliance within range of the network 112, and allowing the appliance to configure itself through inquiry of adjacent appliance 110, and/or through interaction with the identified network 112. In one example, the appliance 110 may identify the network 112, may present configuration questions on the interface 216, and based upon the answers provided to the configuration questions, configure itself to operate on the system 100. In another example, the appliance 110 may poll appliances within range of the appliance 110 and obtain configuration information from the local appliances 110. In any instance, however, the appliance 110 may allow for an advanced user and/or a service technician (either locally or through the system 100) to access network configurations to allow the appliance to be specifically configured.

In one example embodiment, the appliance 110 is adapted to download an execute application from the application server 120. As previously described, the downloaded application also known as an "app", may be a computer executable software program designed to help the user to perform specific tasks. Examples include enterprise software, accounting software, office suites, graphics software and media players. The applications may be bundled with the appliance 110 and its system software, or may be published and downloaded separately through the application server 120 and/or other publishing means. In this example, the applications may be executable separately from the system software necessary for operation of the appliance 110, or may be integrated into the system software as desired. For instance, the applications may comprise various application programming interfaces (APIs) for different development communities, and the developers of applications may place their apps in various locations on the application server 120.

In yet another example, each the appliance 110 may monitor operation through the sensors 222, 224 and query the service server 126 to ensure the appliance is operating within certain efficiency guidelines, such as for example, Energy Star, or the like. Thus, the networked appliance 110 in the system 100 may communicate to ensure an eco-system that incentivizes the manufacturer and/or the user to operate the appliance 110 within acceptable energy management parameters.

The example secure protocol 230 includes executable instructions which cause the secure protocol 230 to present the user with options regarding operational choices as well as options regarding privacy. For instance, the user of the appliance 110 may decide to opt-out of any intelligent gathering of data due to privacy concerns, and therefore, operate the appliance 110 without any networking capability. Additionally, the secure protocol 230 may allow the user to elect to block and/or restrict access to the networks 112, 12 as desired.

In still another example, the appliance 110 may allow a user to access the status and/or operation of the appliance through a separate processing device 20', 20", such as a personal computer, tablet, mobile device, etc. In this instance, the user may be provided with a user interface that allows the user to view and/or control such information as the power state of the appliance 110, the current operation of the appliance, the contents of the appliance (if equipped with a video device), the diagnostic status of the appliance, etc. The user may be able to remotely program and control the appliance 110 through the processing device as desired.

Specifically, in at least one example, the appliance 110 may be include a maintenance and/or failure detection routine that when executed on the microprocessor 220, allows the appliance 110 to detect a repair and/or preventable maintenance situation through the sensors 222, 224. In this example, the microprocessor 220 may communicate through the user interface 216 the detected situation, and/or may communicate through the networks 112, 12, to the host server 68 and/or to various other devices 20', 20". Still further, the host server 69 may actively push out a maintenance and/or service reminder regarding the appliance 110 based upon the history of the appliance 110 and without the input of the sensors 222, 224.

The maintenance/repair alerts and reminders may include specific instructions to repair and/or effect the service directly by the user. In particular, one example alert may be provided to the user which includes an alert to stay up to date on the required maintenance by alerting the user to when it is needed to provide simple maintenance on the appliance 110. The alert may provide such details as an identified clog in the appliance (such as a dryer vent), a part that needs to be cleaned, such as a direct shelf, a dirty air filter, dirty coils, etc. The alerts may also include inventory notifications, such as the amount of an item in inventory within the appliance 110, and a suggestion for reordering such inventory. In still other instances, the alert may include a step-by-step instruction to perform the maintenance/repair and including optional text and/or videos to ensure proper execution of the repair. By providing the system 100, the appliances 110 may be optimally monitored to ensure better operation and longer lifespan, while minimizing the long-term cost of repairs.

Although certain example systems and methods have been described herein, the scope of coverage of this patent is not limited thereto. On the contrary, this patent covers all methods, apparatus, and articles of manufacture fairly falling within the scope of the appended claims either literally or under the doctrine of equivalents.

We claim:
1. A system for networking an appliance, comprising:
   an appliance, comprising:
      a microcontroller;
      a memory coupled with the microcontroller and having stored thereon computer executable instructions for operating the appliance;

at least one sensor coupled to the microcontroller to monitor the operation of the appliance, wherein at least one sensor data generated by the at least one sensor and indicative of operation of the appliance is stored in the memory;

a user interface coupled to the microcontroller and having provided thereon user interface elements to provide information regarding the operation of the appliance;

a communicator coupled to the microcontroller, the communicator adapted to provide network connectivity, wherein the appliance is adapted to communicate with a network, wherein the appliance is adapted to communicate with another appliance, wherein the communicator is configured to transmit the at least one sensor data indicative of operation of the appliance to one or more of the network and the another appliance, wherein the communicator is configured to transmit energy use data to a meter and the at least one sensor data to a host system, and wherein the appliance is adapted to communicate with the meter to determine a particular time to operate to minimize costs; and the host system connected to the network and adapted to receive the at least one sensor data indicative of operation of the appliance and, in response to the received at least one sensor data, to transmit computer readable instructions to the appliance that when executed by the microcontroller, cause the microcontroller to modify the operation of the appliance.

2. The system of claim 1, wherein the appliance further comprises a secure protocol coupled to the user interface.

3. The system of claim 1, wherein the appliance further comprises a common access port.

4. The system of claim 3, wherein the common access port is separate from the communicator.

5. The system of claim 3, wherein the secure protocol coupled to one or more of the user interface and the common access port.

6. The system of claim 1, wherein the appliance and the another appliance are made from different manufacturers, wherein the system is adapted to provide interoperability with different manufactures of the appliance and the another appliance.

7. The system of claim 1, wherein the appliance is adapted to communicate with the meter to determine the particular time to operate a schedulable batch process to minimize the costs.

8. The system of claim 1, wherein the host system comprises an application server to provide at least one application to the appliance.

9. The system of claim 1, wherein the host system comprises an upgrade server to provide at least one set of computer executable instructions to modify the computer executable instructions stored in the memory.

10. The system of claim 1, wherein the host system includes an service server to provide data to the appliance to maintain or repair the appliance.

11. The system of claim 10, wherein the service server data is displayed on the user interface.

12. The system of claim 1, wherein the user interface is adapted to display a web browser.

13. The system of claim 1, wherein the communicator is a modem.

14. The system of claim 1, wherein the appliance and the another appliance are adapted to communicate with each other to provide recipe ingredients and cook times.

15. A method of networking a plurality of appliances, comprising:

providing an appliance on a network;

controlling operation of the appliance with a microcontroller;

storing on a memory coupled with the microcontroller, computer executable instructions for operating the appliance;

sensing the operation of the appliance, wherein at least one sensor data generated by the sensing and indicative of the operation of the appliance is stored in the memory;

displaying on a user interface coupled to the microcontroller, a user interface element to provide information regarding the operation of the appliance;

communicating through a communicator coupled to the microcontroller, the communicator adapted to provide network connectivity, wherein the appliance is adapted to communicate with a network, wherein the appliance is adapted to communicate with another appliance, wherein the communicator is configured to transmit the at least one sensor data indicative of operation of the appliance to one or more of the network and the another appliance, wherein the communicator is configured to transmit energy use data to a meter and the at least one sensor data to a host system, and wherein the appliance is adapted to communicate with the meter to determine a particular time to operate to minimize costs; and providing the host system connected to the network and adapted to receive the at least one sensor data indicative of usage of the appliance and, in response to the received at least one sensor data, to transmit data to the microcontroller to influence operation of the appliance.

16. The method of claim 15, further comprising securing access to the user interface through a secure protocol.

17. The method of claim 15, further comprising providing access to the microcontroller through a common access port coupled to the microcontroller.

18. The method of claim 17, further comprising securing one or more of the user interface and the common access port through a secure protocol.

19. The method of claim 15, wherein the appliance and the another appliance are made from different manufacturers, wherein the system is adapted to provide interoperability with different manufactures of the appliance and the another appliance.

20. The method of claim 19, wherein the appliance is adapted to communicate with the meter to determine the particular time to operate a schedulable batch process to minimize the costs including electrical costs.

* * * * *